United States Patent
Tateyama

(10) Patent No.: US 8,154,748 B2
(45) Date of Patent: Apr. 10, 2012

(54) DIGITAL BROADCAST RECEPTION APPARATUS AND METHOD OF PRINTING INFORMATION CONTENTS IN THE APPARATUS

(75) Inventor: Jiro Tateyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1028 days.

(21) Appl. No.: 12/065,181

(22) PCT Filed: Aug. 28, 2006

(86) PCT No.: PCT/JP2006/316896
§ 371 (c)(1),
(2), (4) Date: Apr. 17, 2008

(87) PCT Pub. No.: WO2007/026657
PCT Pub. Date: Mar. 8, 2007

(65) Prior Publication Data
US 2009/0135445 A1    May 28, 2009

(30) Foreign Application Priority Data
Aug. 30, 2005    (JP) .................................. 2005-249952

(51) Int. Cl.
*G06F 3/12*    (2006.01)
*G06K 15/00*    (2006.01)
(52) U.S. Cl. ...................... 358/1.15; 358/1.13; 358/1.18
(58) Field of Classification Search ........................ None
See application file for complete search history.

(56) References Cited

U.S. PATENT DOCUMENTS

| 2001/0028408 | A1 | 10/2001 | Arima ........................... 348/460 |
| 2002/0060748 | A1* | 5/2002 | Aratani et al. ................ 348/552 |
| 2005/0091698 | A1 | 4/2005 | Shikata |
| 2009/0109466 | A1* | 4/2009 | Yoshikawa et al. .......... 358/1.15 |

FOREIGN PATENT DOCUMENTS

| JP | 2001-186449 | 7/2001 |
| JP | 2002-91726 | 3/2002 |
| JP | 2002-158979 | 5/2002 |
| JP | 2003-134447 | 5/2003 |
| JP | 2003-271502 A | 9/2003 |
| JP | 2004-297346 | 10/2004 |
| JP | 2005-130082 A | 5/2005 |

OTHER PUBLICATIONS

International Search Report, Written Opinion, and International Preliminary Report on Patentability in PCT/JP2006/316896.
Apr. 3, 2008 International Preliminary Report on Patentability in PCT/JP2006/316896.

* cited by examiner

*Primary Examiner* — Dov Popovici
(74) *Attorney, Agent, or Firm* — Fitzpatrick, Cella, Harper & Scinto

(57) ABSTRACT

A digital television which allows a user to view a digital broadcast program designates print information to be printed when making a DTV printer print using program information of the digital broadcast program and the print information supplied together with the program information. The digital television determines whether the print information is a content A supplied from a broadcast station together with the program information or a content B supplied from a WEB server by downloading it from a supply source. If the print information is the content B, the digital television determines whether the print information can be downloaded from the supply source prior to the program broadcasting. A system is thus constructed which can determine whether the print information can be printed when the user reserves printing of the print information.

27 Claims, 15 Drawing Sheets

FIG. 4

RECIPE OF THIS WEEK "CALIFORNIA DON"

**INGREDIENTS
(ONE PORTION)**

| | |
|---|---|
| AVOCADO | 1 |
| CUCUMBER | 1 |
| LETTUCE | 5 PIECES |
| BEEF | 150 g |
| RICE | 200 g |
| PEPPER TO TASTE | |

PICTURE: FINISHED CALIFORNIA DON

INSTRUCTIONS

PICTURE: COOKING STEP 1 step1:
CUT AVOCADO AND CUCUMBER INTO CUBES AND TOSS THEM WITH MAYONNAISE, LEMON JUICE, SALT, AND PEPPER

PICTURE: COOKING STEP 2 step2:
THEN···

PICTURE: COOKING STEP 3 step3:
FINALLY···

FIG. 12

18:00 - 19:00 JULY 14 (FRIDAY)
CHANNEL A "NEWS PROGRAM"

○ RESERVE RECORDING
● RESERVE PRINTING

PRINT AT THE TIME OF BROADCASTING

FIG. 13

18:00 - 19:00 JULY 14 (FRIDAY)
CHANNEL B "COOKING PROGRAM"

○ RESERVE RECORDING
● RESERVE PRINTING

PRINT AT THE TIME OF BROADCASTING

IMMEDIATE PRINT

FIG. 15

RECIPE OF THIS WEEK "CALIFORNIA DON"

INGREDIENTS
(ONE PORTION)

AVOCADO         1
CUCUMBER        1
LETTUCE         5 PIECES
BEEF            150 g

PICTURE: FINISHED CALIFORNIA DON

INSTRUCTIONS step1:
CUT AVOCADO AND CUCUMBER INTO CUBES AND TOSS THEM WITH MAYONNAISE, LEMON JUICE, SALT, AND PEPPER step2:
THEN · · ·

PICTURE: COOKING STEP 1

PICTURE: COOKING STEP 2

PREVIEW

IMMEDIATE PRINT

PRINT AT THE TIME OF BROADCASTING

DIGITAL BROADCAST RECEPTION APPARATUS AND METHOD OF PRINTING INFORMATION CONTENTS IN THE APPARATUS

TECHNICAL FIELD

The present invention relates to an information content printing technique in a digital broadcast reception apparatus which allows a user to view a digital broadcast program.

BACKGROUND ART

In digital broadcast, a variety of information contents using data broadcast except moving images and audio sounds are supplied during broadcasting. The user can obtain information contents by making a digital broadcast reception apparatus display a data broadcast window on a television set, and manipulating remote controller buttons while viewing the screen.

FIG. 2 shows an example of data broadcast in a cooking program. While procedures of cooking are broadcast in moving pictures and audio sounds, the cooking recipe information is supplied on the data broadcast window. This cooking program is a program-synchronized interactive cooking program.

FIG. 3 shows an example of a remote controller used in a digital broadcast apparatus. The user presses a d button on the remote controller to call a data broadcast window. The user then can confirm the cooking recipe window as in FIG. 2. The user presses the d button again to restore the previous moving image window from the data broadcast window state.

A method of allowing the user to operate the data broadcast window shown in FIG. 2 with the remote controller buttons will be described below. There are two methods: a method of allowing the user to move an active area with cursor buttons and confirm the area with an OK button; and a method of allowing the user to directly confirm the area with four color buttons (blue, red, green, and yellow). For actions indicated by four boxes displayed in the lower portion of the window, when the user wants to move the window to the top window, he moves the cursor to the blue box and presses the OK button. Alternatively, the user directly presses the blue button.

When the user wants to move the window to the next page, the user executes "green: next" on the window. However, if a recipe is described in four pages, that is, the first page describing the ingredients as indicated by page 1/4 and the remaining three pages describing the instructions, the user cannot grasp the contents without viewing all of the four pages.

A print content shown in FIG. 4 is prepared separately. When the user executes "yellow: print" on the data broadcast window in FIG. 2, he can transmit as a print content detailed recipe information explaining the ingredients for one portion and the instructions to a printer. In this case, the contents having the four pages on the window in FIG. 2 can be printed altogether on one A4 sheet (e.g., see Japanese Patent Laid-Open No. 2002-158979 ("patent document 1")).

In the time zone of a digital broadcast program, the user uses the remote controller to directly input a print instruction for the print contents supplied during broadcasting the digital broadcast program and print the print contents. If the reception apparatus can be automatically started at the time of broadcasting a preset program, extract only the print contents from the reception data, and transmit the contents to the printer, print can be executed in the form of a print reservation (e.g., see Japanese Patent Laid-Open No. 2001-186449 ("patent document 2")).

As a print reservation setting method, presence/absence information of a print content may be added to program information of an EPG referred to at the time of making a recording reservation. In this case, automatic printing of a program having a print content can be reserved at the broadcasting time in the same method as in a recording reservation using the EPG (e.g., see Japanese Patent Laid-Open No. 2004-297346 ("patent document 3")).

The EPG stands for an Electric Program Guide. The user can always obtain latest television program information with the EPG and can search for a program title which is conveniently used for the recording reservation of a serial drama. The user can perform a reservation operation by simply clicking a program list indicated on the screen. The user can reserve recording of any program using three types of EPGs, "terrestrial wave data broadcasting", "Internet", and "visit place (cell phone/Internet) at any time and at any place.

In a PUSH distribution service in which the above print content is superposed on data broadcast and the resultant content is transmitted, repeated Carousel transmission from a broadcast station contains the print content. For this reason, the restriction of a data size in one-loop transmission and the data transfer using a broadcast wave lower the transfer rate. The state-of-the-art technique can cope with only a print content in a small data size mainly including a text in consideration of the performance of the data transfer processing of the reception apparatus itself.

A PULL distribution service described in Japanese Patent Laid-Open No. 2002-091726 ("patent document 4") can eliminate the demerit of the PUSH distribution using the broadcast wave. More specifically, the storage destination of the print content is set in an arbitrary server on the Internet, and the data can be downloaded via the network. Any reception apparatus connected to the Internet can obtain the print content without using a broadcast wave.

A print instruction from the reception apparatus to a printer apparatus can be made by directly notifying the printer apparatus of the URL of the data storage destination. The printer apparatus downloads the data serving as the print content from the notified URL and executes printing, thereby further decreasing the processing load on the reception apparatus (e.g., see Japanese Patent Laid-Open No. 2002-091726 ("patent document 4")).

Patent Document 1: Japanese Patent Laid-Open No. 2002-158979
Patent Document 2: Japanese Patent Laid-Open No. 2001-186449
Patent Document 3: Japanese Patent Laid-Open No. 2004-297346
Patent Document 4: Japanese Patent Laid-Open No. 2002-091726

DISCLOSURE OF INVENTION

Problems that the Invention is to Solve

The print reservation in patent documents 2 and 3 uses the PUSH distribution service in which the print content superposed in the data during program broadcasting is automatically received and printed. However, the PUSH distribution cannot pre-confirm in a reservation stage which print content is output or how many sheets are printed out. This may result in print not required by the user.

Patent document 3 has a function of temporarily storing a print-reserved print content. The user can confirm the stored print content and transmit it to the printer. However, since the data size of the print content is not limited, the reception apparatus must have a large-capacity storage device (e.g., a HDD) to store the data, resulting in economical and mounting disadvantages.

Means of Solving the Problems

In order to solve the problem described above according to the present invention, there is provided a digital broadcast reception apparatus which allows a user to view a digital broadcast program, comprising a print control unit adapted to cause a print apparatus to print using print information of the digital broadcast program, a designation unit adapted to designate print information to be printed, a discrimination unit adapted to discriminate whether the print information is first print information provided together with the digital broadcast program or second print information which can be obtained by requesting a download to a providing source, a determination unit adapted to, when the print information is the second print information, determine whether the second print information can be downloaded from the providing source prior to the program broadcast, and a display control unit adapted to cause a display apparatus to display a tile information of the digital broadcast program and that the program has the first print information or second print information by using respectively different discriminating information.

According to the present invention, there is also provided a printing method in a digital broadcast reception apparatus which allows a user to view a digital broadcast program, comprising a print control step of causing a print apparatus to print using print information of the digital broadcast program, a designation step of designating print information to be printed, a discrimination step of discriminating whether the print information is first print information provided together with the digital broadcast program or second print information which can be obtained by requesting a download to a providing source, a determination step of, when the print information is the second print information, determining whether the second print information can be downloaded from the providing source prior to the program broadcasting, and a display control step of causing a display apparatus to display a tile information of the digital broadcast program and that the program has the first print information or second print information by using respectively different discriminating information.

Effects of the Invention

According to the present invention, whether the print information is the first print information provided together with the program information or the second print information downloaded from the providing source is discriminated. Whether the second print information can be downloaded from the providing source prior to the program broadcasting is determined.

More specifically, when reserving print of the print content in the program information displayed in the EPG, whether the print content is the PUSH distribution or the PULL distribution is determined. If the print content is the PULL distribution and the data is uploaded in the designated URL, print is immediately started. The contents of the print content can be confirmed in advance.

A system capable of determining whether print is allowed when the user reserves print can be constructed.

Other features and advantages of the present invention will be apparent from the detailed description with reference to the accompanying drawings. The same reference numerals denote the same or equivalent parts throughout the accompanying drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 4 is a view showing an example of a print content in the cooking program;

FIG. 12 is a view showing a reservation window displayed when the print reservation of a news program is executed using the EPG;

FIG. 13 is a view showing an example of a reservation window displayed when print of a cooking program is reserved using the EPG;

FIG. 15 is a view showing an example of the preview window of a print content in the second embodiment.

DESCRIPTION OF REFERENCE NUMERALS

Figure 1:
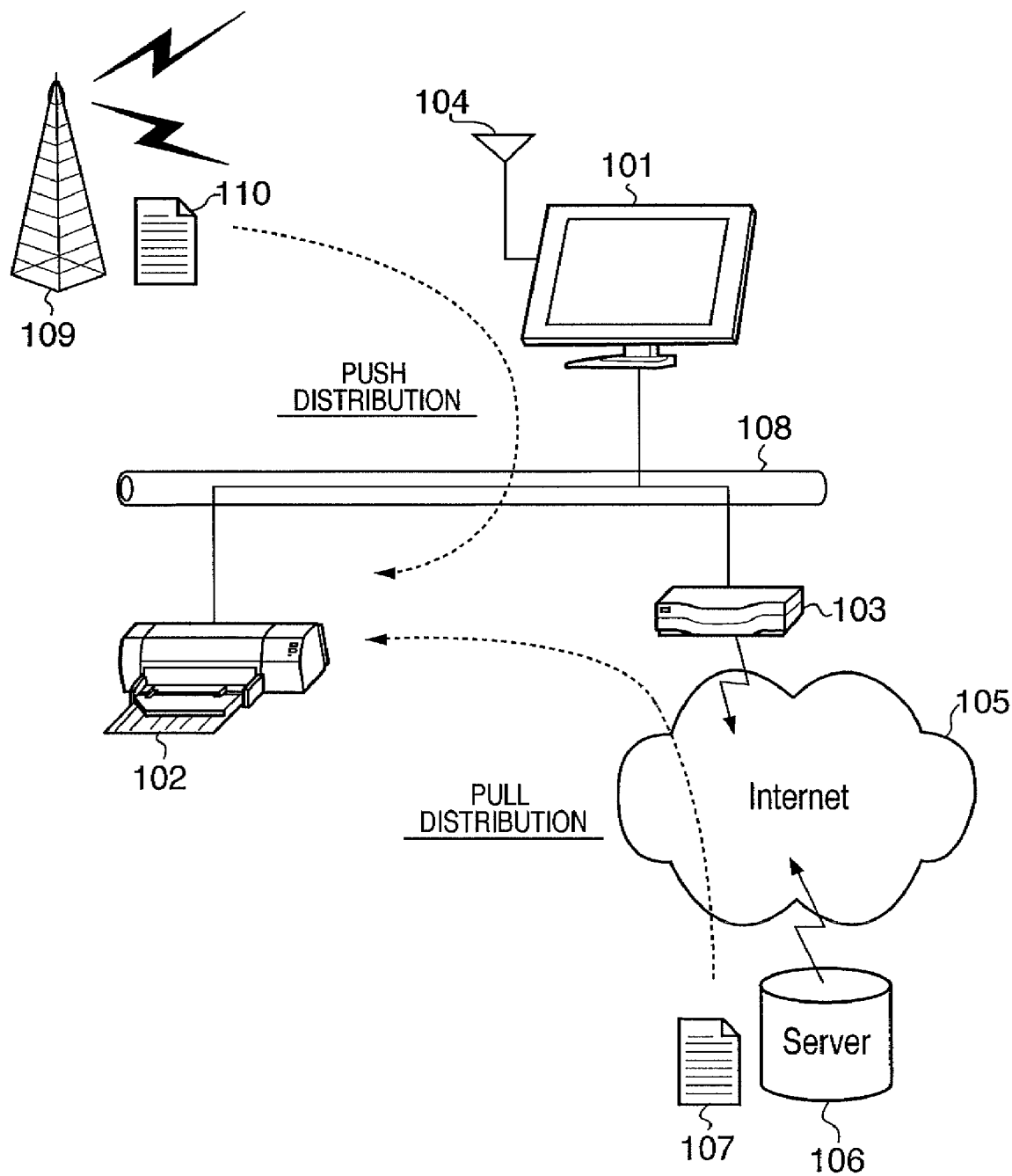
FIG. 1 is a view showing an example of connections of devices in a home network environment according to an embodiment of the present invention.
Figure 2:
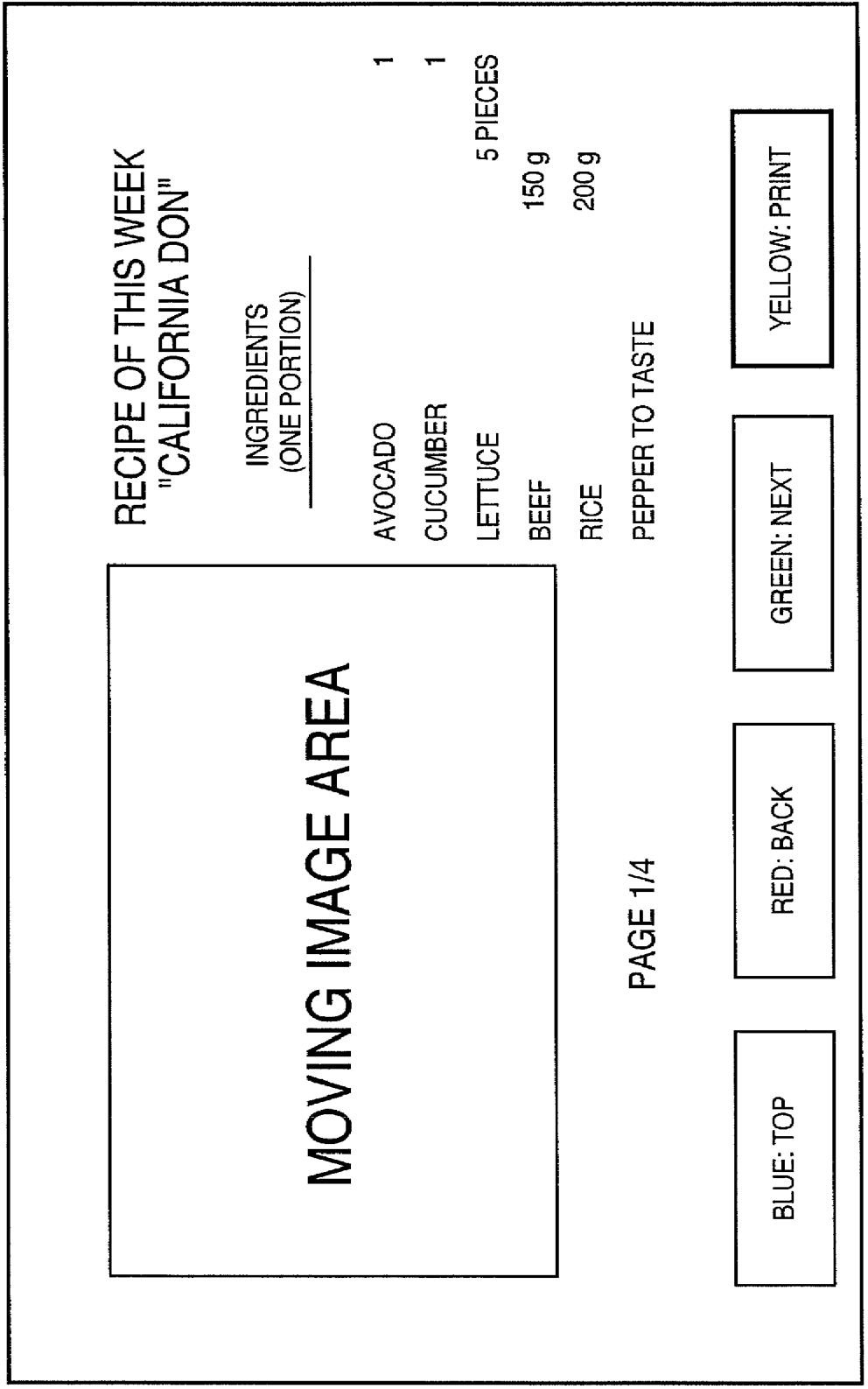
FIG. 2 is a view showing an example of a data broadcast window in a cooking program.

101 . . . digital TV
102 . . . DTV printer
103 . . . broadband router
104 . . . antenna
105 . . . Internet
106 . . . WEB server
107 . . . content B
108 . . . Ethernet®
109 . . . broadcast station
110 . . . content A
501 . . . CPU
502 . . . memory
503 . . . tuner
504 . . . demodulator circuit
505 . . . demultiplexer
506 . . . video decoder
507 . . . audio decoder
508 . . . data decoder
509 . . . display+speaker 510 . . . internal bus
511 . . . remote controller I/F
512 . . . network I/F
601 . . . network controller
602 . . . printer controller
603 . . . print medium
604 . . . contents data
605 . . . image data
1001 . . . news program
1002 . . . cooking program
1003 . . . . English conversation program
1004 . . . soccer live broadcast program

BEST MODE FOR CARRYING OUT THE
INVENTION

An embodiment according to the present invention will be described in detail with reference to the accompanying drawings.

The embodiments to be described below are merely examples of implementation means of the present invention. Various changes and modifications can be made depending on the arrangements of apparatuses to which the present invention is applied and various conditions. The present invention is not limited to the particular embodiments described below.

First Embodiment

FIG. 1 is a view showing an example of connections of devices in a home network environment according to an embodiment of the present invention.

A digital television (DTV) 101 as a device operated as a reception apparatus and a DTV printer 102 as a device operated as a print apparatus are connected via an Ethernet® 108 in the home network. The DTV can be connected to the Internet 105 via a broadband router 103 connected to the Ethernet® 108. The DTV can arbitrarily read and browse contents data 107 on a server 106 and download the contents data 107 using a PULL distribution service.

The DTV 101 can receive via an antenna 104 a digital broadcast program distributed from a broadcast station 109 and allow the user to view the digital broadcast program. A print content 110 is superposed on the digital broadcast program distributed from the broadcast station 109. The DTV uses a PUSH distribution service which automatically receives the print content and prints it.

Figure 5:
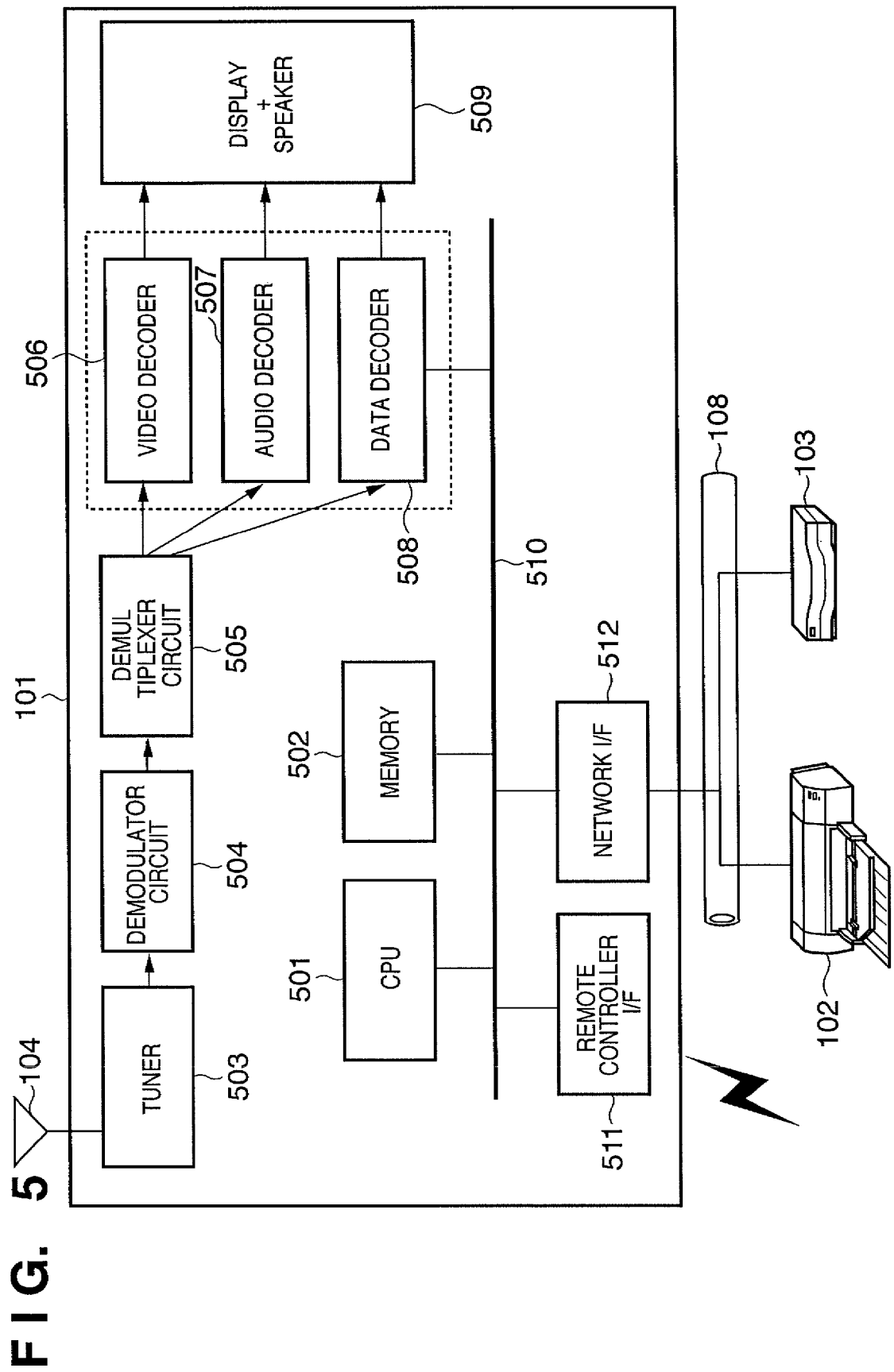
FIG. 5 is a block diagram showing the internal arrangement of a DTV.

FIG. 5 is a block diagram showing the internal arrangement of the DTV 101 of this embodiment.

Referring to FIG. 5, reference numeral 501 denotes a CPU which performs the main control of the DTV 101. Reference numeral 502 denotes a memory made up of a flash memory and an SD-RAM. Reference numeral 511 denotes a remote controller interface which performs infrared communication with the remote controller shown in FIG. 3. Reference numeral 512 denotes a network interface which communicates with a network device connected to the external Ethernet® 108. Internal bus line 510 connects the respective components.

The functions of blocks for performing digital broadcast reception control will be described below.

A digital broadcast wave is transmitted by encoding contents data such as a moving image, audio sound, and data in accordance with MEPG-2, compressing the encoded data, and multiplexing the compressed data. A tuner 503 connected to the antenna 104 receives the broadcast wave sent from the broadcast station. A demodulator circuit 504 demodulates the broadcast wave received by the tuner 503 into an MPEG-2TS (Transport Stream) packet. A demultiplexer circuit 505 demultiplexes the TS multiplex stream. The respective data demultiplexed by the demultiplexer circuit 505 are decoded as follows. A video decoder 506 decodes the input data into video data, an audio decoder 507 decodes the input data into audio data, and a data decoder 508 decodes the input data into data for broadcast data. These output data are supplied to a display and speaker.

Figure 6:
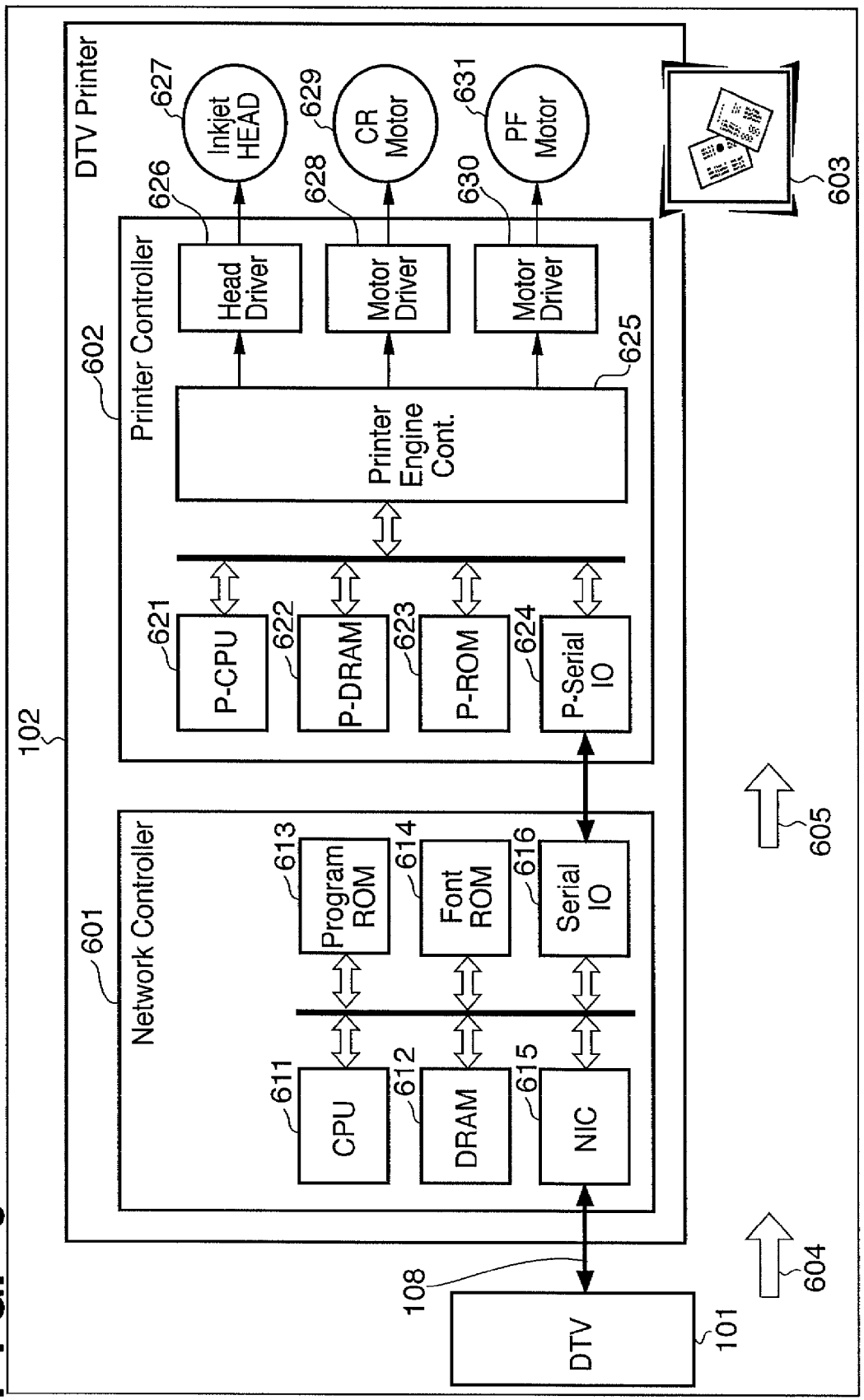
FIG. 6 is a block diagram showing the arrangement of a DTV printer.

FIG. 6 is a block diagram showing the arrangement of the DTV printer 102 serving as the print apparatus of this embodiment.

When a print content supply side is the DTV 101, the DTV 101 has a lack of performance to generate print image data using a printer driver. The DTV 101 transfers a print content in the data format of XHTML to the DTV printer 102, and the DTV printer 102 interprets and prints the data.

Print processing of the DTV printer 102 will be described below.

The DTV printer 102 receives print contents data 604 in the XHTML format from the DTV 101 via the Ethernet® 108. In the DTV printer, a network controller 601 and a printer controller 602 perform print processing. The network controller 601 interprets the input contents data 604 and generates print image data 605. The printer controller 602 outputs an image on a print medium (Print Media) 603 based on the print image data.

The arrangement of the network controller 601 will be described below.

Reference numeral 611 denotes a CPU which performs main control. Reference numeral 612 denotes a DRAM used as a buffer memory or work memory for temporarily storing received contents data. Reference numeral 615 denotes a network interface controller (NIC) which communicates with a device connected to the Ethernet® 108. Reference numeral 613 denotes a program ROM in which execution programs are written. Reference numeral 614 denotes a font ROM in which font data are written. Reference numeral 616 denotes a serial IO used for communication with the printer controller 602. The internal bus connects these blocks.

The arrangement of the printer controller 602 will be described below.

Reference numeral 621 denotes a P-CPU which performs main control. Reference numeral 622 denotes a P-DRAM used as a buffer memory or work memory for temporarily storing the received image data. Reference numeral 623 denotes a P-ROM in which execution programs are written. Reference numeral 624 denotes a printer engine controller 624 which communicates with the network controller 601 connected to the serial IO 616. These blocks are connected to a printer engine controller 625 via the internal bus. The printer engine controller 625 is connected to a head driver 626 for driving an inkjet head 627 in a print mechanism, a motor driver 628 for driving a carriage motor 629, and a motor driver 630 for driving a paper feed motor 631.

Figure 7:
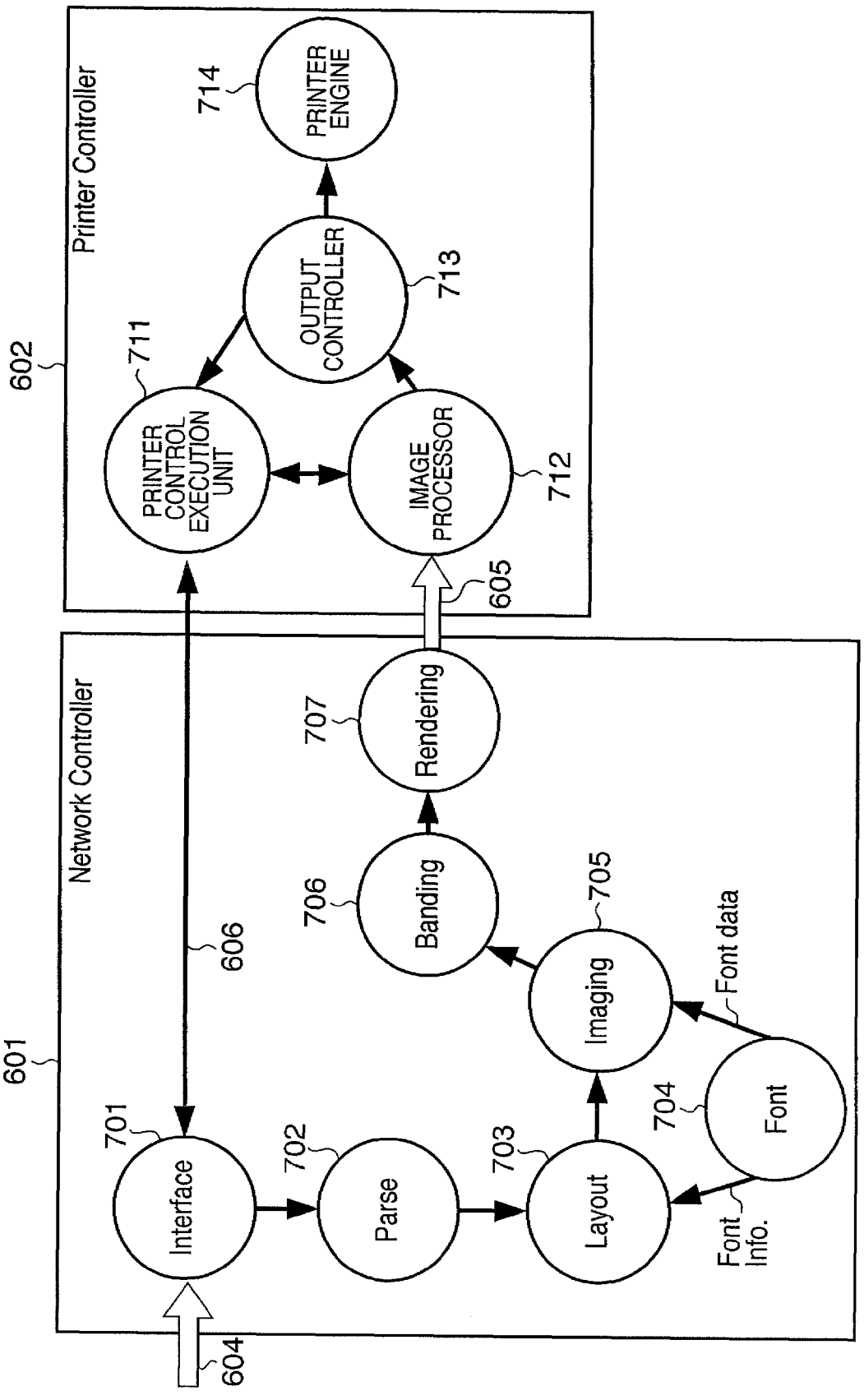
FIG. 7 is a view showing the outline of software processing in the DTV printer.

FIG. 7 is a view showing the outline of software processing of the DTV printer 102.

The respective functional modules of the network controller 601 will be described below.

An interface 701 is a module which receives the contents data 604 sent from the host and transferring it to a parser (Parse) 702. The interface 701 also has a function of acquiring print statuses such as the absence of a sheet or ink and informing the host side of status information (Printer Status) 606.

The parser (Parse) 702 is a module which analyzes the syntax of contents data described in the XHTML language.

The contents data 604 is input as an "individual file form" or a packaged "collective module form".

A layout processor (Layout) 703 is a module which creates the parsed syntax information as layout information data of a print object.

A font processor (Font) 704 is a module which creates and manages font data designated by contents data. The font processor 704 is also called to obtain font information (Font Info.) in generating layout information data in the layout processing.

An imaging processor (Imaging) 705 is a module which decodes image data (e.g., JPEG data) in a print object into RGB bitmap data and performing resolution conversion for size adjustment.

A banding processor (Banding) 706 is a module which divides a rendering area into a plurality of bands and causing a rendering processor 707 to performing rendering for each band.

The rendering processor (Rendering) 707 is a module which performs rendering based on the layout information data obtained in the layout processing and outputting print image data in which color component pixels of a color image are made of multi-level data.

The respective modules of the printer controller 602 will be described below.

In this embodiment, an inkjet printer is used as the print apparatus to constitute a system. In this system, the printer does not perform advanced image processing. The system rasterizes a print image on a memory space ensured in the system. The system converts the print image into a form to allow the printer to directly print. The system then sends the data to the printer engine, thereby printing it.

A printer control execution unit 711 is a module which performs the main control of the printer. The printer control execution unit 711 manages the operations of an image processor 712 and an output controller 713, monitors the print execution status, and outputs it as the printer status information to the network controller 601.

The image processor 712 is a module which converts the input image data 605 from multi-level RGB data to binary YMCK data in accordance with the output form to a printer engine 714. The banding processor 706 optimally utilizes the memory space to perform the above conversion processing and the output to the printer engine 714. When a sufficiently large memory is mounted, an area capable of rasterizing the image data of one page may be ensured.

The output controller 713 is a module which sequentially outputs the image data converted into binary YMCK data and output from the image processor 712 as color data in accordance with the driving pattern of the inkjet head mounted in the printer engine 714.

The printer engine 714 mainly comprises a head for discharging ink in accordance with image data (not shown), a carriage mechanism for scanning a carrier on which the head is mounted, and a printer movable portion made up of a paper feed mechanism used for media conveyance.

<<PrintBasic Service>>

The outline of PrintBasic service print processing will be described below.

There are mainly two PrintBasic Service print processing methods: one is a PUSH transfer type direct print method; and the other is a PULL transfer type indirect print method. These two print methods will be described below.

<PUSH Transfer Type Direct Print Method>

Figure 8:
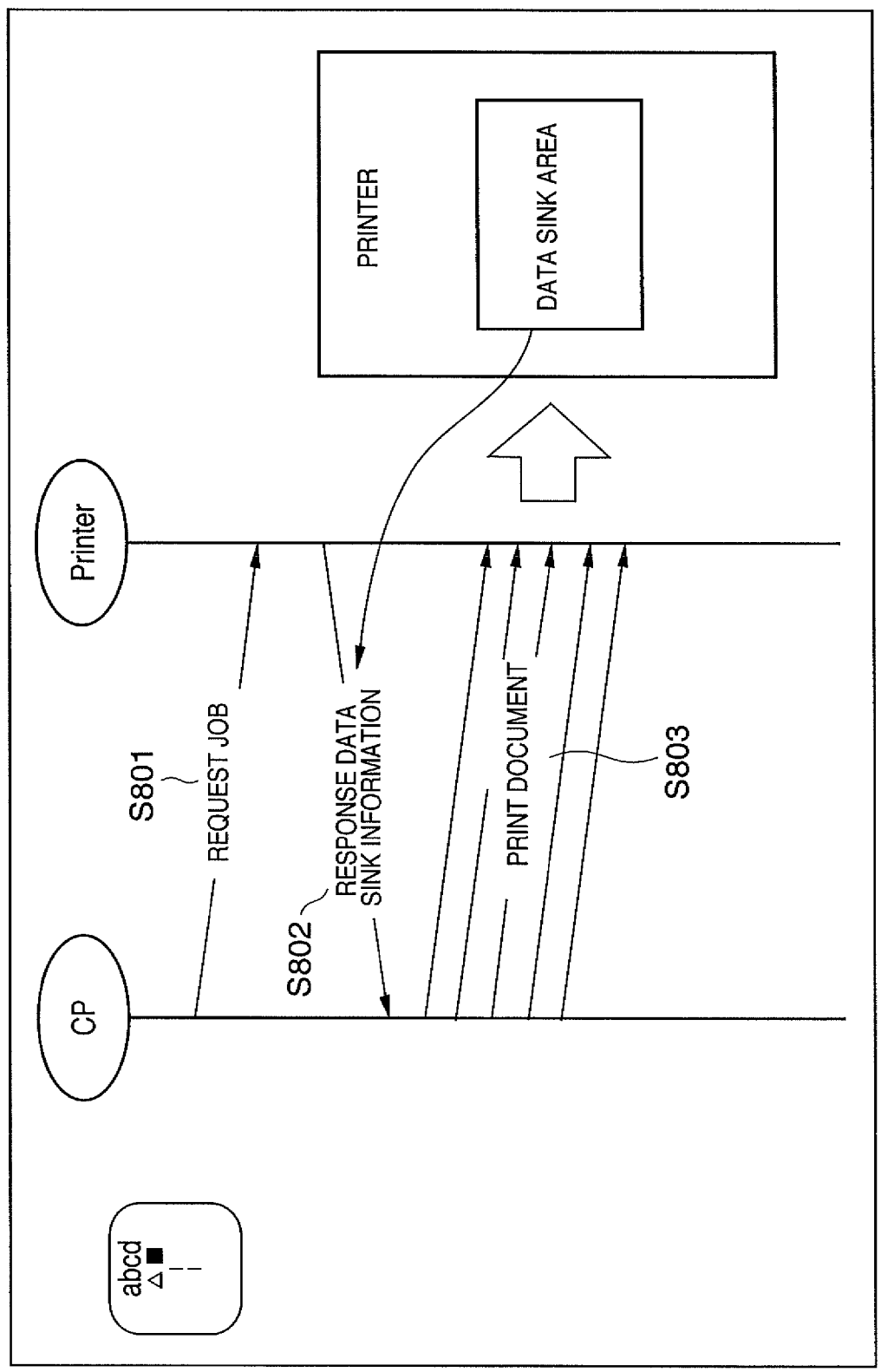
FIG. 8 is a view for explaining a PULL transfer type direct print method.

FIG. 8 is a view for explaining a PUSH transfer type direct print method of this embodiment. In the PUSH transfer type service, a print content is superposed on data broadcast and transmitted together with a program video transmitted from the broadcast station. The reception apparatus sends this print content to the printer, thereby printing the print content. As described above, since in the PUSH distribution service the print data is transmitted together with the broadcast data even if the user does not perform the reception operation for printing, data synchronized with the broadcast data can be easily distributed.

A control point (CP) issues a request JOB to the printer when a print document is prepared (S801). When the printer can accept printing, it sets a print data reception data sink area and returns a response to the control point together with the setting area information (S802). The control point starts transferring data of the print document in "HTTP POST" based on the setting area information. The printer receives the transfer data and stores it in the data sink area. The printer starts printing using the data sink data.

<PULL Transfer Type Indirect Print Method>

Figure 9:
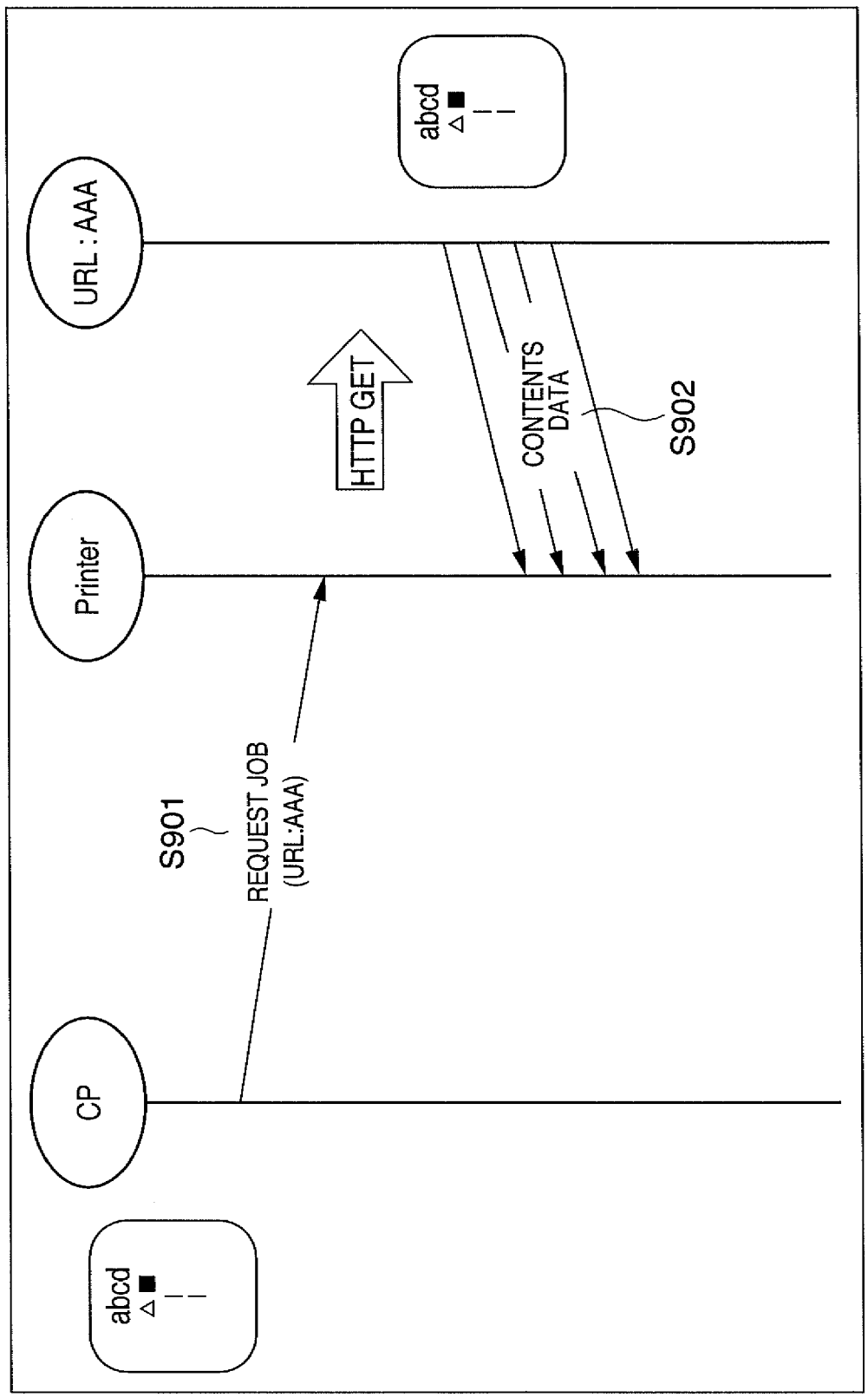
FIG. 9 is a view for explaining a PUSH transfer type indirect print method.

FIG. 9 is a view for explaining a PULL transfer type indirect print method of this embodiment. In the PULL transfer type service, the broadcast station sends URL information representing the storage location of the print content to the reception apparatus. At the reception apparatus, the user performs processing for downloading and acquiring the print content stored in the URL destination. In this method, even if the user knows only URL information, he can access the print content without real-time program broadcasting, thereby obtaining the data. For example, the user can conveniently learn in advance the contents of the program prior to the broadcasting of an educational program.

The control point determines the URL of the print document and issues a request JOB together with its URL information (S901). The printer receives its JOB, issues "HTTP GET" based on the URL information if the printer is in a printable state, and acquires the print content in the URL destination (S902). The printer starts printing using the acquired contents data.

The basic print concept in the PrintBasic service has been described above. The control point (CP) in this system corresponds to the DVT 101, and the printer corresponds to the DTV printer 102. The control point (CP) may be applicable to a tuner or personal computer separately from a display device.

In this embodiment, the PULL transfer type indirect print method for causing the DTV printer 102 itself to obtain the print content is defined as the PULL distribution. The PUSH transfer type direct print method for sending the print content to the DTV printer 102 via the broadcast wave is defined as the PUSH distribution.

Figure 10:
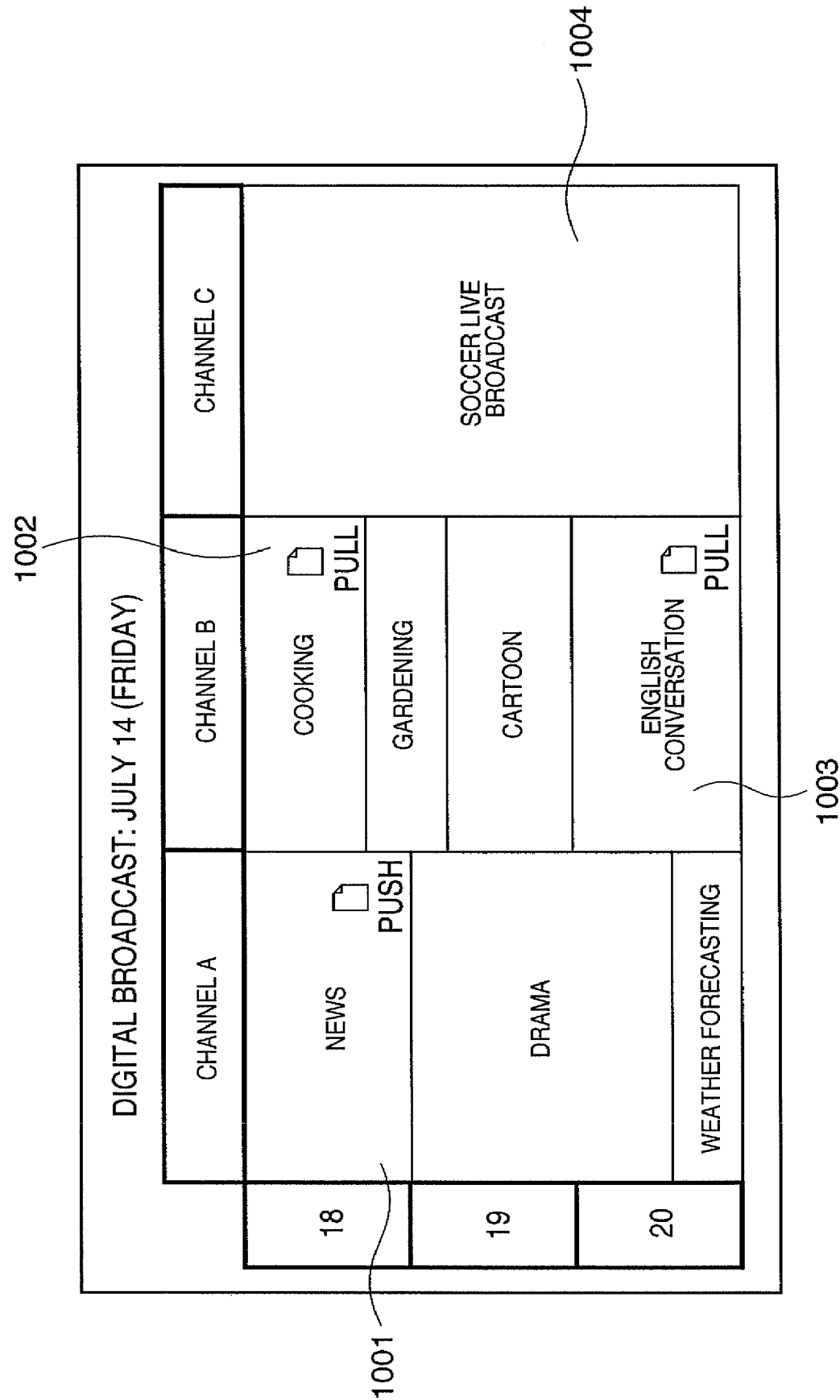
FIG. 10 is a view showing a window which allows a user to confirm the print content of each program in the program information displayed in an EPG according to the embodiment of the present invention.

FIG. 10 is a view showing an example of a window capable of confirming print content information of each program in program information displayed in the EPG of this embodiment.

As shown in FIG. 10, using the EPG program information, the DTV 101 generates a broadcast program list capable of discriminating information representing a program having a PUSH transfer type print content from information representing a program having a PULL transfer type print content.

The general form of an EPG window arrangement is displayed in a matrix structure including an upper channel frame and a left time frame. The number of channels and the time zone to be simultaneously displayed are limited due to the restriction of the window resolution. However, the user can use the remote controller to scroll the window, thereby arbitrarily changing the display positions of the channels and time zone.

The program information of a news program 1001 on channel A in the EPG window includes a "PUSH inscribed" in the form of an icon indicating a print content. The user understands that the news program is a content to be PUSH-distributed within the program time. A cooking program 1002 and an English conversation program 1003 on channel B include "PULL inscribed" in the form of icons indicating the print contents. The user can understand that these programs are contents acquired in PULL distributions. On the other hand, no print content icon is displayed in the program information for a program (e.g., a soccer live broadcast program 1004) for which a print content is not prepared.

Note that information representing the PUSH transfer type print content or information representing the PULL transfer type print content is contained in the program information as a code which can be interpreted by the DTV 101. However, such information may be contained as the text data of the program information. The DTV 101 may detect the print content as the PUSH or PULL transfer type print content by detecting a predetermined keyword in the text.

Figure 11:
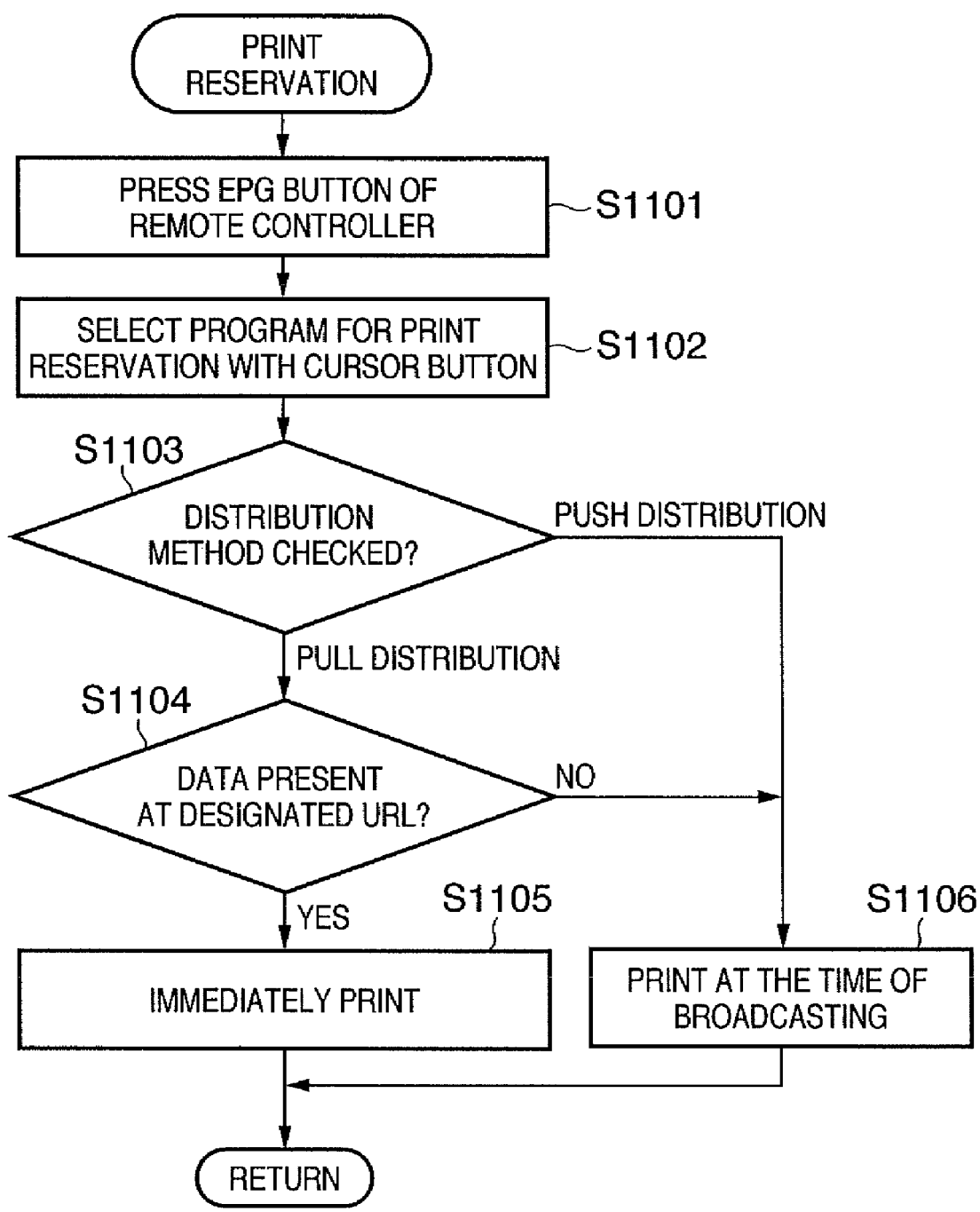
FIG. 11 is a flowchart for executing a print reservation in the first embodiment.

FIG. 11 is a flowchart for executing a print reservation in this embodiment.

Figure 3:
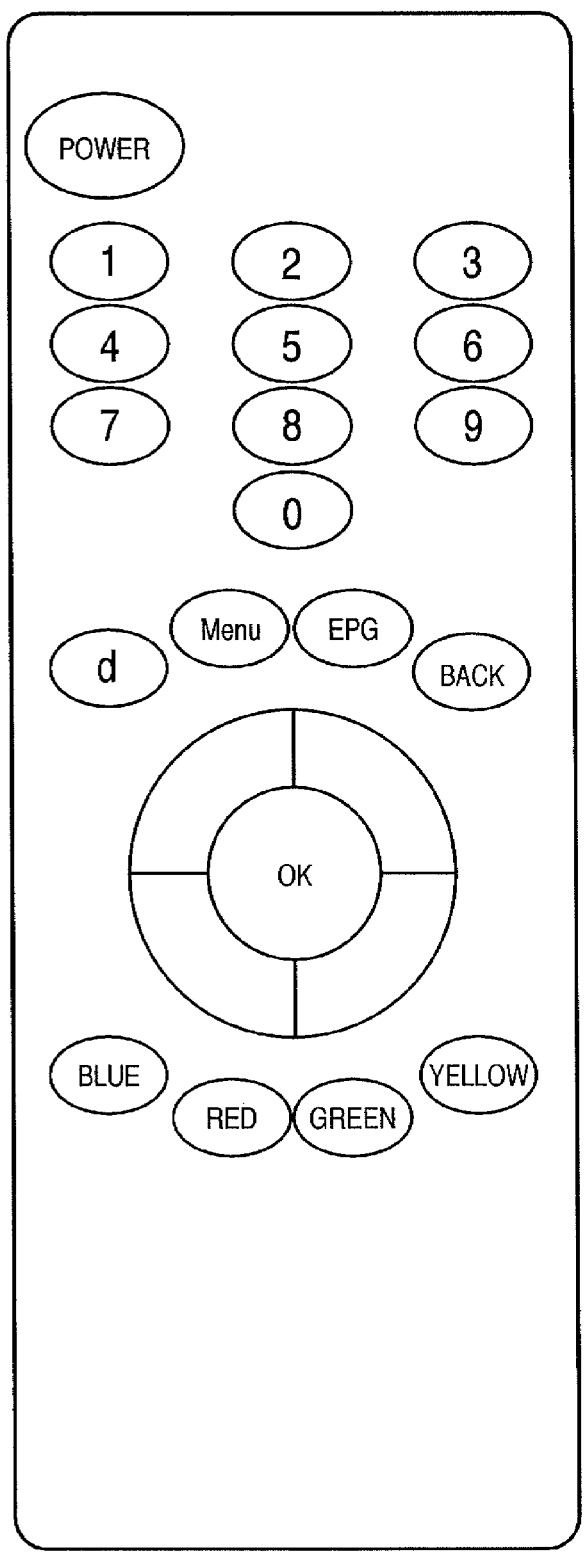
FIG. 3 is a view showing a remote controller used in a digital broadcast device.

The user sets a reservation by manipulating the remote controller shown in FIG. 3. The user first presses the EPG button (S1101) to display the EPG shown in FIG. 10 on the window of the DTV 101. The user manipulates the cursor on the EPG window to move it to a program capable of print reservation. The user then presses the OK button to select the program (S1102). The user discriminates whether the print content distribution method of this program is PUSH or PULL (S1103). If the distribution method is the PUSH distribution, the user can set "print at the time of broadcasting" (S1106). If the distribution method is the PULL distribution, the user checks if the data is uploaded at the designated URL (S1104). If the uploaded data is present, the user can set "immediate print" (S1105). When the data is not uploaded at the time of reservation, the user can set "print at the time of broadcasting" (S1106).

FIG. 12 is a view showing a reservation window displayed when the user selects the news program 1001 in FIG. 10 using the EPG and reserves printing.

The user has confirmed from the EPG program information that the PUSH distribution print content is prepared for the news program 1001. When the user selects the print reservation, the "print at the time of broadcasting" shown in step S1106 of FIG. 11 is displayed. The user presses the yellow button of the remote controller to complete the setting of the print reservation which will be executed at the time of broadcasting.

FIG. 13 is a view showing a reservation window displayed when the user selects the cooking program 1002 in FIG. 10 using the EPG and performs the print reservation.

The user has confirmed from the EPG program information that the PULL distribution print content is prepared for the cooking program 1002. When the user selects the print reservation, he checks the presence/absence of the data in step S1104 of FIG. 11. If the user confirms the presence of the data, the "immediate print" box in step S1105 is displayed; otherwise, no box is displayed. When the data is present, the user can arbitrarily select "immediate print" or "print at the time of broadcasting". To select "immediate print", the user presses the red button of the remote controller. To select "print at the time of broadcasting", the user presses the yellow button of the remote controller, thereby completing the print reservation setting.

According to the embodiment described above, when printing the print content in the EPG program information, the user discriminates whether the print content is the PUSH or PULL distribution. Information representing the presence of a printable content is included in the EPG program information.

If the program information is given by the PULL distribution at the time of print reservation using the EPG, the user can check in advance if the print content has been uploaded in the server on the Internet.

When the PULL distribution is determined and the data has been uploaded to the designated URL, the user can immediately print the data or can confirm the contents of the print content in advance.

Advantageously, the user can easily search for a program whose print content can be output in advance while viewing the EPG window. The user can print a text document used in a program of the correspondence course of education or the like and learn it in advance.

Second Embodiment

As described in the first embodiment, the storage destination URL of the print content is known in advance in the PULL distribution. The second embodiment will explain a method of setting print reservation upon confirming the preview window of the print content when the user reserves for printing.

A DTV 101 is shipped as a model in which general browser software is preinstalled so as to allow the user to browse general homepages on the Internet. The preinstalled general browser software can display the XHTML files forming a print content on the screen albeit in a partial form. It is possible for the state-of-the-art system to display a preview window enough to recognize layout information using the DTV 101.

Figure 14:
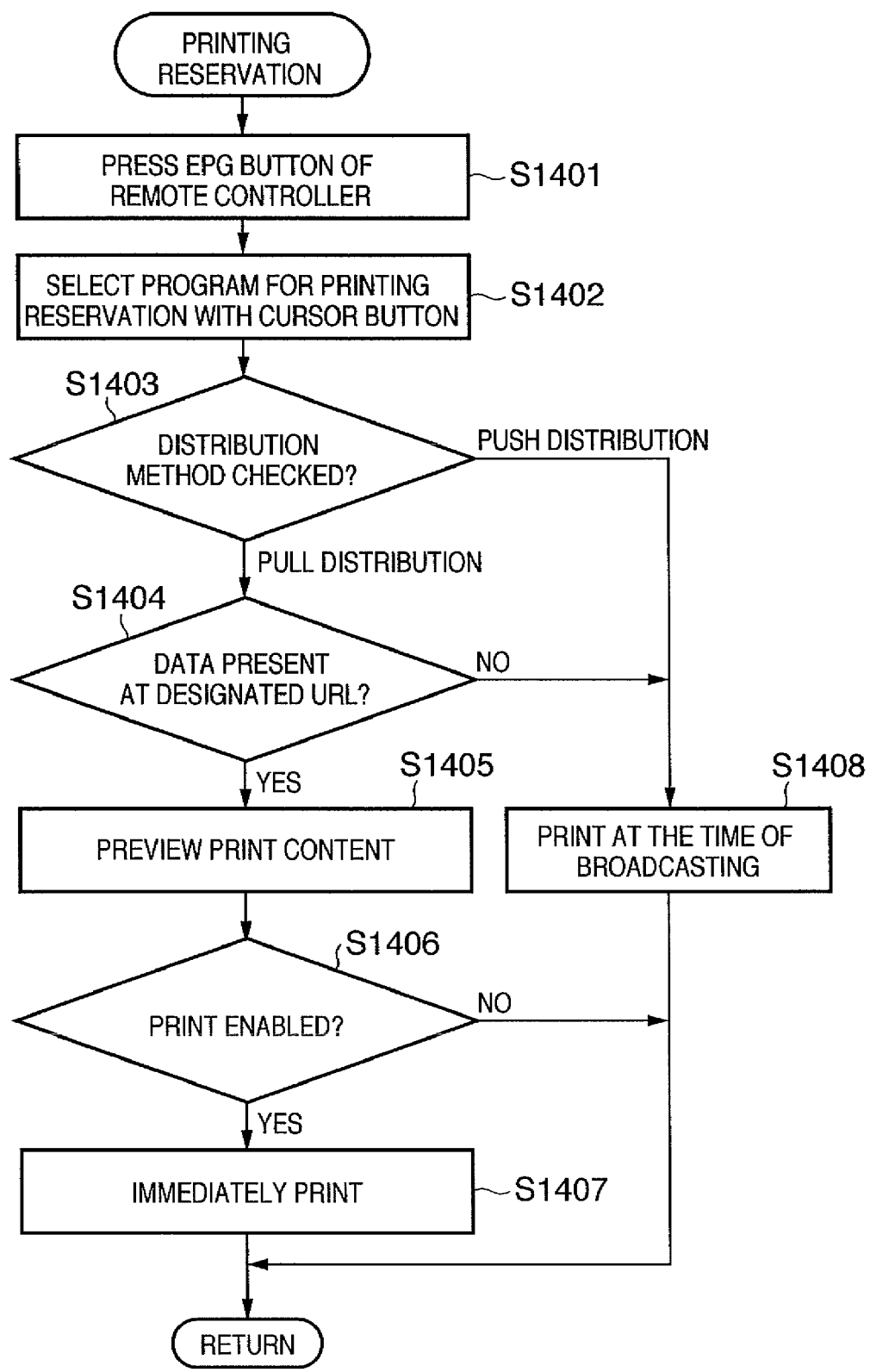
FIG. 14 is a flowchart for executing a print reservation in the second embodiment.

FIG. 14 is a flowchart for executing a print reservation according to the second embodiment.

The user manipulates the remote controller to perform reservation setting. The user first presses the EPG button (S1401) to display the EPG program list shown in FIG. 10 on the window of the DTV 101. The user manipulates the cursor on the EPG window to move it to a program capable of print reservation. The user then presses the OK button to select the program (S1402). The user discriminates whether the print content distribution method of this program is PUSH or PULL (S1403). If the distribution method is the PUSH distribution, the user can set "print at the time of broadcasting" (S1408). If the distribution method is the PULL distribution, the user checks if the data is uploaded at the designated URL (S1404). If the uploaded data is present, the user can perform "preview display" (S1405). The user determines based on the preview result whether he wants to print this content (S1406). If the user wants to immediately print the content, he can set "immediate print" (S1407).

FIG. 15 is a view showing the preview display window of a print content according to the second embodiment.

In FIG. 13 showing the reservation window displayed when the user selects a cooking program 1002 using the EPG and performs the print reservation, the user has confirmed from the EPG program information that the PULL distribution print content is prepared for the cooking program 1002. When the user selects the print reservation, he checks the presence/absence of the data in step S1404 of FIG. 14. If the user confirms the presence of the data, the "preview" box in step S1405 is displayed. When the user presses the blue button of the remote controller, the preview window in FIG. 15 can be displayed.

Upon checking the print content layout information on the preview window, the user can arbitrarily select "immediate print" or "print at the time of broadcasting". To select "immediate print", the user presses the red button of the remote controller. To select "print at the time of broadcasting", the user presses the yellow button of the remote controller, thereby completing the print reservation setting.

In addition to the effect of the first embodiment, the second embodiment provides the following effect. When the user reserves printing using the EPG, he checks in advance if the print content has been uploaded in the server on the Internet. The user previews the print content. Therefore, the user can print the content after confirming the contents of the print content.

The user confirms the print content on the preview window. He can arbitrarily select the output form (setting for double-sided print or 2-in-1 print) of the print content and a sheet size, thereby preventing an unwanted print output.

Other Embodiments

The embodiments of the present invention have been described in detail. A DTV 101 may acquire or generate print data or a DTV printer 102 may control its acquisition or generation. Data may be downloaded from the server via a communication line such as the Internet under the control of either apparatus.

The present invention can be practiced in the forms of a system, apparatus, method, program, storage medium (recording medium), and the like. More specifically, the present invention can be applied to either a system constituted by a plurality of devices, or an apparatus consisting of a single piece of equipment.

The objects of the present invention can be achieved by implementing some of the illustrated functional blocks and operations by either hardware circuits or software processing using a computer.

Note that the present invention includes a case wherein the invention is achieved by directly or remotely supplying a program of software that implements the functions of the aforementioned embodiments to a system or apparatus, and reading out and executing the supplied program code by a computer of that system or apparatus. In this case, a computer of the system or the like reads out and executes the program code.

Therefore, the program code itself installed in a computer to implement the functional processing of the present invention using the computer implements the present invention. That is, the present invention includes the computer program itself for implementing the functional processing of the present invention.

In this case, the form of program is not particularly limited, and an object code, a program to be executed by an interpreter, script data to be supplied to an OS, and the like may be used as long as they have the program function.

As a recording medium (storage medium) for supplying the program, for example, a flexible disk, hard disk, optical disk, magneto-optical disk, and the like may be used. In addition, MO, CD-ROM, CD-R, CD-RW, magnetic tape, nonvolatile memory card, ROM, DVD (DVD-ROM, DVD-R), and the like may be used.

As another program supply method, connection can be established to a home page on the Internet using a browser on a client computer, and the computer program itself of the present invention can be downloaded from the home page. Also, the program can be supplied by a compressed file containing an automatic installation function from the home page onto a recording medium such as a hard disk or the like. Also, the program code that forms the program of the present invention may be segmented into a plurality of files, which may be downloaded from different home pages. That is, the present invention includes a WWW server which makes a plurality of users download a program file required to implement the functional process of the present invention by a computer.

Also, a storage medium such as a CD-ROM or the like, which stores the encrypted program of the present invention, may be delivered to the user, and the user who has cleared a predetermined condition may be allowed to download key information that decrypts the program from a home page via the Internet. In this case, the user executes the encrypted program using that key information to be installed on a computer, thus implementing the present invention.

The functions of the aforementioned embodiments may be implemented not only by executing the readout program code by the computer but also by some or all of actual processing operations executed by an OS or the like running on the computer based on an instruction of that program.

Furthermore, the functions of the aforementioned embodiments may be implemented by some or all of actual processes executed by a CPU or the like arranged in a function expansion board or a function expansion unit, which is inserted into or connected to the computer, after the program read out from the recording medium is written in a memory of the expansion board or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-249952, filed Aug. 30, 2005, which is hereby incorporated by reference herein in its entirety.

The invention claimed is:

1. A digital broadcast reception apparatus which allows a user to view a digital broadcast program, the apparatus comprising:
   a print control unit adapted to cause a print apparatus to print using print information of the digital broadcast program;
   a determination unit adapted to, when the print information is information which can be obtained by requesting a download to a providing source, determine whether the print information can be downloaded from the providing source prior to the program broadcasting; and
   a display control unit adapted to cause a display apparatus to display discriminately whether the print information can be downloaded or not based on a determination result of the determination unit.

2. The reception apparatus according to claim 1, wherein said display control unit displays whether print information of a program can be downloaded or not where a recording of the program is reserved.

3. The reception apparatus according to claim 2, further comprising a reservation unit adapted to allow a user to reserve a download of the print information if the print information of the program is disabled to download where a recording of the program is reserved.

4. A printing method in a digital broadcast reception apparatus which allows a user to view a digital broadcast program, the method comprising:
   a print control step of causing a print apparatus to print using print information of the digital broadcast program;

a determination step of, when the print information is information which can be obtained by requesting a download to a providing source, determining whether the print information can be downloaded from the providing source prior to the program broadcasting; and a display control step of causing a display apparatus to display discriminately whether the print information can be downloaded or not based on a determination result of the determination step.

5. The printing method according to claim 4, wherein in the display control step, there is performed a step of displaying whether print information of a program can be downloaded or not where a recording of the program is reserved.

6. The printing method according to claim 5, further comprising a reservation step of allowing a user to reserve a download of the print information if the print information of the program is disabled to download where a recording of the program is reserved.

7. A digital broadcast reception apparatus which allows a user to view a digital broadcast program, the apparatus comprising:
    a print control unit adapted to cause a print apparatus to print using print information of the digital broadcast program;
    a designation unit adapted to designate print information to be printed;
    a discrimination unit adapted to discriminate whether the print information is first print information provided together with the digital broadcast program or second print information which can be obtained by requesting a download to a providing source; and
    a generation unit adapted to generate a list of digital broadcast programs, the list enabling to discriminate information representing a program having the first print information from information representing a program having the second print information.

8. The reception apparatus according to claim 7, wherein that the first print information is a PUSH transfer print content, and the second print information is a PULL transfer print content.

9. A printing method in a digital broadcast reception apparatus which allows a user to view a digital broadcast program, the method comprising:
    a print control step of causing a print apparatus to print using print information of the digital broadcast program;
    a designation step of designating print information to be printed;
    a discrimination step of discriminating whether the print information is first print information provided together with the digital broadcast program or second print information which can be obtained by requesting a download to a providing source; and
    a generation step of generating a list of digital broadcast programs, the list enabling to discriminate information representing a program having the first print information from information representing a program having the second print information.

10. The printing method according to claim 9, wherein the first print information is a PUSH transfer print content, and the second print information is a PULL transfer print content.

11. A digital broadcast reception apparatus which allows a user to view a digital broadcast program, comprising:
    a print control unit adapted to cause a print apparatus to print using print information of the digital broadcast program;
    a designation unit adapted to designate print information to be printed;
    a discrimination unit adapted to discriminate whether the print information is first print information provided together with the digital broadcast program or second print information which can be obtained by requesting a download to a providing source;
    a determination unit adapted to, when the print information is the second print information, determine whether the second print information can be downloaded from the providing source prior to the program broadcasting; and
    a display control unit adapted to cause a display apparatus to display a tile information of the digital broadcast program and that the program has the first print information or second print information by using respectively different discriminating information.

12. The reception apparatus according to claim 11, further comprising:
    the display apparatus, which is adapted to, when the print information is the second print information and the second print information is present in the providing source in a downloadable state, display the second print information; and
    an enable/disable determination unit adapted to determine whether said print control unit enables or disables execution of the second print information displayed by the display apparatus.

13. The reception apparatus according to claim 12, wherein the reception apparatus is connected to said print apparatus via a network, and
    wherein said print apparatus receives a print request of print information from the reception apparatus, downloads the second print information from the providing source, and prints the second print information.

14. The reception apparatus according to claim 11, wherein the reception apparatus downloads the second print information on the basis of information for recognizing a storage location of a print content on a network.

15. The reception apparatus according to claim 11, wherein the first print information is a PUSH transfer print content, and the second print information is a PULL transfer print content.

16. The reception apparatus according to claim 11, further comprising a generation unit adapted to generate a list of digital broadcast programs, said generation unit generating a list which can discriminate information representing a program having the first print information from information representing a program having the second print information.

17. The reception apparatus according to claim 11, wherein said display control unit displays whether print information of the program can be downloaded or not where a recording of the program is reserved.

18. The reception apparatus according to claim 17, further comprising a reservation unit adapted to allow a user to reserve a download of the print information if the print information of the program is disabled to download where a recording of the program is reserved.

19. A printing method in a digital broadcast reception apparatus which allows a user to view a digital broadcast program, comprising:
    a print control step of causing a print apparatus to print using print information of the digital broadcast program;
    a designation step of designating print information to be printed;
    a discrimination step of discriminating whether the print information is first print information provided together with the digital broadcast program or second print information which can be obtained by requesting a download to a providing source;

a determination step of, when the print information is the second print information, determining whether the second print information can be downloaded from the providing source prior to the program broadcasting; and a display control step of causing a display apparatus to display a tile information of the digital broadcast program and that the program has the first print information or second print information by using respectively different discriminating information.

20. The printing method according to claim 19, further comprising:

a display step of, when the print information is the second print information and the second print information is present in the providing source in a downloadable state, displaying the second print information; and an enable/disable determination step of determining whether said print control step enables or disables execution of the second print information displayed in the display step.

21. The printing method according to claim 19, wherein the reception apparatus is connected to said print apparatus via a network, and wherein said print apparatus receives a print request of print information from the reception apparatus, downloads the second print information from the providing source, and prints the second print information.

22. The printing method according to claim 19, wherein the reception apparatus downloads the second print information based on information for recognizing a storage location of a print content on a network.

23. The printing method according to claim 19, wherein the first print information is a PUSH transfer print content, and the second print information is a PULL transfer print content.

24. The printing method according to claim 19, further comprising a print setting step of:

when the print information is the second print information and is present in the providing source in a downloadable state, enabling setting for immediately executing print, and when the second print information is not present in the providing source in the downloadable state, enabling setting for executing print at the time of program broadcasting.

25. The printing method according to claim 24, wherein in said print setting step, there is performed a step of enabling setting for executing print at the time of the program broadcasting when the print information is the first print information.

26. A program stored on a non-transitory computer-readable medium for causing a computer to execute a printing method according to any one of claims 4, 9, and 19.

27. A non-transitory computer-readable storage medium storing the program according to claim 26.

* * * * *